(12) United States Patent
Seidler et al.

(10) Patent No.: US 11,246,455 B2
(45) Date of Patent: Feb. 15, 2022

(54) KITCHEN APPLIANCE, FOOD PROCESSOR AND SAFETY INTERLOCK ARRANGEMENT

(71) Applicant: KENWOOD LIMITED, Havant (GB)

(72) Inventors: Mark Seidler, Havant (GB); Martin Hunt, Havant (GB); Ben Woodling, Havant (GB); Jamie Cox, Havant (GB); Jamie Weaden, Havant (GB)

(73) Assignee: KENWOOD LIMITED, Havant (GB)

( * ) Notice: Subject to any disclaimer, the term of this patent is extended or adjusted under 35 U.S.C. 154(b) by 623 days.

(21) Appl. No.: 16/079,597

(22) PCT Filed: Feb. 24, 2017

(86) PCT No.: PCT/GB2017/050499
§ 371 (c)(1),
(2) Date: Aug. 24, 2018

(87) PCT Pub. No.: WO2017/144910
PCT Pub. Date: Aug. 31, 2017

(65) Prior Publication Data
US 2019/0045977 A1 Feb. 14, 2019

(30) Foreign Application Priority Data
Feb. 25, 2016 (GB) ...................................... 1603326

(51) Int. Cl.
*A47J 44/02* (2006.01)
*A47J 43/07* (2006.01)

(52) U.S. Cl.
CPC ............... *A47J 44/02* (2013.01); *A47J 43/07* (2013.01)

(58) Field of Classification Search
CPC ................................... A47J 43/07; A47J 44/02

USPC ................ 99/348, 510, 511, 503, 337, 338, 99/342–344, 326–333, 485, 486, 492, 99/493, 501–513; 241/92, 282.1, 282.2, 241/199.12, 37.5, 36, 280, 101.01, 101.2; 219/492, 494, 442, 486, 714; 366/144–146, 314, 601, 197, 199, 200, 366/201, 206, 213, 222, 224, 344
See application file for complete search history.

(56) References Cited

U.S. PATENT DOCUMENTS 2,002,333 A   5/1935  Strauss
2,597,063 A * 5/1952  Catanzano ............ G07F 13/065
                                            222/129.4

(Continued)

FOREIGN PATENT DOCUMENTS

CN        2185551 Y    12/1994
CN       101543380 A    9/2009

(Continued)

OTHER PUBLICATIONS

International Search Report and Written Opinion issued in PCT/GB2017/050499, dated Jul. 24, 2017; ISA/EP.

(Continued)

*Primary Examiner* — Dana Ross
*Assistant Examiner* — Ket D Dang
(74) *Attorney, Agent, or Firm* — Harness, Dickey & Pierce, P.L.C.

(57) ABSTRACT

A kitchen appliance (1), comprising: a base unit (100); and a food processor (500) having an outlet (416) for outputting processed food; wherein the food processor (500) is arranged to be mounted on the base unit (100) for operation such that it is capable of movement between two operating positions, whereby the outlet (416) is positionable at two different places.

19 Claims, 12 Drawing Sheets

(56) References Cited

U.S. PATENT DOCUMENTS

| | | | | |
|---|---|---|---|---|
| 4,095,751 | A | * | 6/1978 | Artin .................. A47J 43/046 |
| | | | | 222/410 |
| 4,390,133 | A | | 6/1983 | Wanat |
| 5,875,706 | A | * | 3/1999 | Borger ................ A47J 43/087 |
| | | | | 99/492 |
| 2002/0080678 | A1 | | 6/2002 | Daniels, Jr. |
| 2010/0107893 | A1 | * | 5/2010 | Goodrick-Meech ........................ |
| | | | | A47J 27/004 |
| | | | | 99/348 |
| 2011/0083565 | A1 | * | 4/2011 | Backus ................ A47J 19/027 |
| | | | | 99/511 |
| 2012/0048977 | A1 | | 3/2012 | Machovina et al. |
| 2014/0190359 | A1 | | 7/2014 | Corkin et al. |
| 2014/0263783 | A1 | | 9/2014 | Benoit et al. |
| 2014/0290499 | A1 | * | 10/2014 | Murbacher .......... A47J 43/087 |
| | | | | 99/348 |
| 2015/0257433 | A1 | * | 9/2015 | Benoit .................. A47J 43/06 |
| | | | | 141/192 |
| 2016/0324368 | A1 | | 11/2016 | Seidler et al. |

FOREIGN PATENT DOCUMENTS

| | | |
|---|---|---|
| CN | 201500040 U | 6/2010 |
| CN | 101874714 A | 11/2010 |
| CN | 101897550 A | 12/2010 |
| CN | 204322137 U | 5/2015 |
| EP | 1745728 A1 | 1/2007 |
| EP | 2206455 A1 | 7/2010 |
| EP | 2594177 A1 | 5/2013 |
| EP | 2633791 A1 | 9/2013 |
| GB | 764361 A | 12/1956 |
| GB | 2217802 A | 11/1989 |
| JP | 3143062 U | 7/2008 |
| WO | WO-2006092477 A1 | 9/2006 |
| WO | WO-2013097702 A1 | 7/2013 |
| WO | WO-2014117343 A1 | 8/2014 |

OTHER PUBLICATIONS

GB Search Report of the Intellectual Property Office issued in Application No. GB1603326.8, claims 1-15, 24, 26 and 60, 62 in part, dated Jul. 26, 2016.

GB Search Report of the Intellectual Property Office issued in Application No. GB1603326.8, claims 16-26, dated Sep. 30, 2016.

GB Search Report of the Intellectual Property Office issued in Application No. GB1603326.8, claims 27-44, 59, and 60, 64 in part, dated Oct. 7, 2016.

GB Search Report of the Intellectual Property Office issued in Application No. GB1603326.8, claims 45-58, 61,63, and 62, 64 in part, dated Oct. 7, 2016.

* cited by examiner

KITCHEN APPLIANCE, FOOD PROCESSOR AND SAFETY INTERLOCK ARRANGEMENT

CROSS-REFERENCE TO RELATED APPLICATIONS

This application is a 371 U.S. National Stage of International Application No. PCT/GB2017/050499, filed Feb. 24, 2017 and published in English as WO 2017/144910 A1 on Aug. 31, 2017. This application claims the benefit of Great Britain Application No. GB1603326.8, filed on Feb. 25, 2016. The disclosure of each of the above-identified applications is incorporated herein by reference.

This invention relates to a kitchen appliance, to a food processor for a kitchen appliance, and to a safety interlock arrangement.

Kitchen appliances having a bowl and a rotating drive provided within the bowl to which tools can be fitted are known in the field of food preparation. The functionality of such kitchen appliances can be limited in processes where several different processing steps are necessary, in particular when different tools are required to perform the different processing steps. This is because it is necessary to stop any processing that is currently underway in order to change the tool, which may further necessitate emptying the bowl.

In addition, the tools available may be unsuitable for performing certain processing operations, such as slicing or grating, in which case a user will be required either to prepare food ingredients by hand, which is time-consuming, or use other kitchen appliances, the need for which occupies more space and costs more.

According to an aspect of the invention, there is provided a kitchen appliance, comprising: a base unit; and a food processor having an outlet for outputting processed food; wherein the food processor is arranged to be mounted on the base unit such that it is capable of rotation about a fixed axis between two positions, whereby rotation of the food processor can position the outlet at two different places.

The two positions between which the food processor may rotate may be indexed. A ratchet mechanism may be arranged to index the two positions. The ratchet mechanism may comprise a protrusion arranged to cooperate with an annular cam having corresponding detents for receiving the protrusion at the first and second positions. The protrusion is preferably biased to extend into the detent, wherein it can be moved against the bias to retract it to remove it from the detent. By indexing the first and second positions, misalignment issues may be avoided.

The food processor may be arranged to be detachably mounted to the base unit. This may help with storage arrangements. Preferably, the food processor may be arranged to be mounted to the base via a bayonet coupling arrangement provided on the base unit and food processor. The food processor may be arranged such that it pivots about the fixed axis between the two positions. The food processor may be arranged such that rotation to a third position allows it to be detached from the base unit. This arrangement may assist in preventing accidental detachment of the food processor during use.

The food processor may comprise a rotatable tool mount for a food processing tool. Preferably, the food processor is arranged to receive drive from the base unit. A separate power supply and/or motor can increase the size of a food processor and make it more complicated to use. Preferably, the food processor is arranged to be mounted to the base unit at a position that is spaced from the platform for supporting a bowl.

At least part of the base unit may be arranged to provide a platform for supporting a bowl. Preferably, the food processor is arranged to output processed food ingredients over the platform when rotated to a first position, and wherein the food processor is arranged to output processed food ingredients at a place removed from the platform for supporting a bowl when rotated to a second position.

The kitchen appliance may further comprise a bowl arranged to be removably (or detachably) mounted on the base unit. Preferably, the food processor is arranged to output processed food ingredients into the bowl (ideally when the bowl is mounted on the platform on the base unit) when rotated to a first position. The bowl may be provided with a rotatable tool mount for a food processing tool, preferably wherein the rotatable tool mount is arranged to be driven by the base unit. Preferably, the food processor is arranged to process food ingredients external to the bowl and to output processed food ingredients from the outlet into the bowl during operation of the kitchen appliance without interruption of drive to the rotatable tool mount.

According to another aspect of the invention there is provided a kitchen appliance, comprising: a base unit; a bowl arranged to be mounted to the base unit; a rotatable tool mount provided within the bowl for a food processing tool, the rotatable tool mount arranged to be driven by the base unit; a food processor having an outlet for outputting processed foods, the food processor being arranged to be mounted to the base unit; wherein the food processor is arranged to process food ingredients external to the bowl and to output processed food ingredients from the outlet into the bowl during operation of the kitchen appliance without interruption of drive to the rotatable tool mount.

Preferably, the food processor is arranged to be driven independently to the rotatable tool mount provided within the bowl. Preferably, the food processor and rotatable tool mount are driven by two separate drive means, for example two electric motors. Preferably, the food processor is arranged to receive drive from the base unit.

A rotatable tool mount for a food processing tool may be provided within the food processor. The rotatable tool mount provided within the food processor preferably has an axis of rotation that is non-coaxial with an axis of rotation of the rotatable tool mount provided within the bowl.

The base unit may be arranged to provide a raised portion for mounting the food processor. A drive means or power source for the food processor may arranged in the base unit beneath the raised portion.

The food processor may be mounted to the base unit via a housing containing a transmission assembly arranged to transmit drive from the base unit to the food processor. Preferably, the food processor comprises a compartment for processing food, which is preferably detachably mountable to the housing.

The food processor may be capable of rotation about a fixed axis between two positions, preferably whereby rotation of the food processor can position the outlet at two different places. Preferably, the food processor is arranged to output processed food ingredients into the bowl when rotated to a first position. The food processor may be arranged to output processed food ingredients away from the bowl when rotated to a second position.

Preferably, the kitchen appliance may further comprise a lid arranged substantially to seal the bowl, the lid having an aperture aligned to receive processed food ingredients output directly from the food processor from a position spaced above the bowl. Preferably, when the food processor is rotated to the first position, the outlet is aligned with the aperture in the lid so as to output processed food ingredients directly into the bowl through the aperture in the lid. The at least two positions may be indexed. A ratchet mechanism may be provided, the mechanism being arranged to index the at least two positions. The food processor may be arranged to be detachable from the base unit when orientated in a third position.

A rotatable tool mount for one or more (preferably different) food processing tool(s) may be provided within both the bowl and the food processor, optionally to provide different food processing functions. The rotatable tool mount provided in the food processor may have an axis of rotation that is offset from an axis of rotation of the rotatable tool mount provided within the bowl.

The food processor may have an outlet for outputting processed food ingredients at a position spaced from the food processor. The outlet may be arranged to extend outwardly from the food processor over the bowl.

According to another aspect of the invention, there is provided a food processor for a kitchen appliance, comprising: a compartment for processing food ingredients; a lid for closing the compartment; and a drive shaft provided within the compartment for driving a tool; wherein the drive shaft is rotatably mounted to the lid.

The drive shaft may comprise one or more engagement elements arranged to be engaged so as to transmit drive to the drive shaft. Preferably, the engagement elements comprise one or more ridges extending longitudinally at least partway along the length of the drive shaft. Preferably, the engagement elements are provided at an unattached end of the drive shaft.

Preferably, the drive shaft is rotatably mounted to the lid such that it can be driven, preferably via a rotatable bearing arrangement provided in the lid. A portion of the drive shaft may be arranged to extend out of the compartment so as to be engaged to be driven by a rotatable drive means external to the food processor.

The food processor may further comprise a housing containing a transmission assembly, the housing being arranged to be mounted to a kitchen appliance, whereby to transmit rotatable drive to the drive shaft therefrom. Preferably, the compartment may be arranged to be detachably mounted (or mountable) to the housing. Preferably, the housing is configured such that it can pivot between two positions when mounted to the kitchen appliance.

The transmission assembly contained in the housing may comprise a drive shaft arranged to transmit rotational drive to the drive shaft mounted to the lid, preferably wherein an axis of rotation of the drive shaft in the transmission assembly is offset from an axis of rotation of a drive shaft provided in the transmission assembly.

The drive shaft may be engaged by a coupling provided in the transmission assembly when the compartment is sealed by the lid when the compartment is mounted to the housing. Preferably, the drive shaft is engaged by a coupling provided in the transmission assembly when the compartment is closed or sealed by the lid when the compartment is mounted to the housing. Removal of the lid from the compartment while it is mounted to the transmission assembly may cause the drive shaft to disengage from the coupling. Preferably, removal of the lid causes the shaft to move from a first position wherein it is engaged by the coupling to a second position in which the transmission assembly is arranged to inhibit rotation of the drive shaft. This arrangement may help to prevent user injury.

The food processor may further comprise an outlet for outputting processed foods, preferably wherein the outlet is a chute through which processed food ingredients are output, preferably wherein the chute is covered along at least part of its length. Optionally, the outlet may be arranged such that it can pivot between a first position and a second position. Preferably, the outlet is arranged to deflect outputted processed foods downwards, preferably as they exit the outlet.

The food processor may further comprise a food processing tool arranged to be mounted to the drive shaft, preferably wherein the food processing tool is arranged to slice or grate food ingredients.

The food processor may further comprise an ejection device that is mountable to the drive shaft, wherein the ejection device is arranged to be rotated by the drive shaft within the compartment such that it will collect food processed by a rotating tool mounted above it, whereby processed food collected on the ejection device can be ejected from the food processor via centrifugal force.

According to another aspect of the invention there is provided a device for a safety interlock mechanism, comprising: a first component and a second component, the first and second components having a working position in which they are coupled together; and a drive shaft rotatably mounted in the first component, the drive shaft having a first position corresponding to the working position of the device in which the drive shaft is arranged to be rotatably driven, and a second position in which rotation of the shaft is inhibited, the drive shaft being arranged to move to the second position when the components are uncoupled.

According to another aspect of the invention there is provided a safety interlock arrangement, comprising: a first component; a second component; and a drive shaft; wherein the first component and second component are arranged to be coupled and uncoupled such that when coupled the drive shaft can receive drive, and when uncoupled drive of the drive shaft is inhibited.

Preferably, the drive shaft is provided on the first component, and is preferably arranged to receive drive from the second component when the first component and second component are coupled. Preferably, the drive shaft is rotatably mounted to the first component. Drive of the drive shaft may be inhibited through the application of a braking or retardation force to the drive shaft.

The drive shaft may be arranged to at least in part extend into the second component when the first component and second component are coupled. The drive shaft may comprise one or more engagement elements arranged to be engaged so as to transmit drive to the drive shaft. The engagement elements may comprise one or more ridges extending longitudinally at least partway along the length of the drive shaft, preferably provided at an unattached end of the drive shaft.

Preferably, one or more protruding interference elements are arranged to interfere with the drive shaft when the first component and second component are uncoupled.

Preferably, when the first and second components are uncoupled, the drive shaft is moved from a first ("coupled") position within the second component to a second ("uncoupled") position within the second component, wherein drive to the drive shaft is inhibited in the second position.

The first component may be a lid, preferably a lid arranged to seal a compartment of a food processor. Preferably, the drive shaft is rotatably mounted to the lid such that it can be driven, preferably via a rotatable bearing arrangement provided in the lid. The second component may be a housing comprising a drive arranged to transmit drive to the drive shaft. Preferably, the housing may comprise an elongate recess arranged to receive the drive shaft when the lid and housing are coupled. Preferably, the second component (or housing) is arranged to receive drive from a base unit of a kitchen appliance and to transmit said drive to the drive shaft.

According to another aspect of the invention there is provided a kitchen appliance incorporating a food processor and/or a safety interlock arrangement as described above. The kitchen appliance may be a kitchen appliance as described above.

According to another aspect of the invention there is provided a food processor incorporating a safety interlock arrangement as described above, preferably a food processor as described above.

The invention extends to methods and/or apparatus substantially as herein described and/or as illustrated in the accompanying drawings.

As used herein, the term "tool" preferably connotes tools for processing food ingredients, for example cutting, slicing, dicing, shredding, stirring, chopping, for example. A "cutting disc" is an example of such a tool.

The invention extends to any novel aspects or features described and/or illustrated herein. In addition, apparatus aspects may be applied to method aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

In this specification the word 'or' can be interpreted in the exclusive or inclusive sense unless stated otherwise.

The invention described here may be used in any kitchen appliance and/or as a stand-alone device. This includes any domestic food-processing and/or preparation machine, including both top-driven machines (e.g., stand-mixers) and bottom-driven machines (e.g., food processors). It may be implemented in heated and/or cooled machines. The invention may also be implemented in both hand-held (e.g., hand blenders) and table-top (e.g., blenders) machines. It may be used in a machine that is built-in to a work-top or work surface, or in a stand-alone device. The invention can also be provided as a stand-alone device, whether motor-driven or manually powered.

Whilst the invention has been described in the field of domestic food processing and preparation machines, it can also be implemented in any field of use where efficient, effective and convenient preparation and/or processing of material is desired, either on an industrial scale and/or in small amounts. The field of use includes the preparation and/or processing of: chemicals; pharmaceuticals; paints; building materials; clothing materials; agricultural and/or veterinary feeds and/or treatments, including fertilisers, grain and other agricultural and/or veterinary products; oils; fuels; dyes; cosmetics; plastics; tars; finishes; waxes; varnishes; beverages; medical and/or biological research materials; solders; alloys; effluent; and/or other substances, and any reference to "food" herein may be replaced by such working mediums. It will be appreciated that the processing of food may include the processing and/or blending of liquid items, and may also include the processing of solid food or ice items into a liquid form.

Certain aspects of the invention disclosed herein may also find application in automotive and industrial fields, the field of tools including hand-tools, the field of plumbing, and the field of hydraulics, for example.

As used herein, means plus function features may be expressed alternatively in terms of their corresponding structure, such as a suitably programmed processor and associated memory, for example.

Aspects and embodiments of the invention are set out in the appended claims. These and other aspects and embodiments of the invention are also described herein.

At least one embodiment of the invention will now be described, by way of example only, with reference to the accompanying drawings, in which.

Figure 1A:
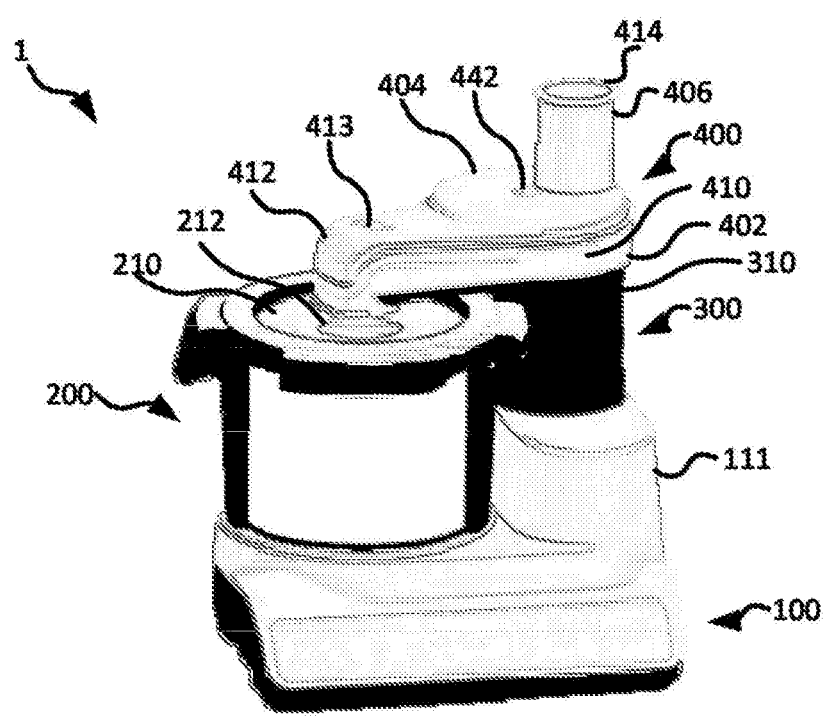
FIG. 1a shows a kitchen appliance with a food processor in a first position.

FIG. 1a shows a kitchen appliance 1 according to an exemplary embodiment of the present invention. The kitchen appliance 1 comprises a base unit 100, a bowl 200, and a food processor 500 comprising a housing containing a transmission assembly 300 and a processor compartment 400. All of these components are arranged to be capable of being detached from the appliance 1. The base unit 100 comprises a first and second drive outlet 102, 104 (shown in FIGS. 5 and 8 respectively), which are preferably arranged to provide rotational drive on substantially parallel axes. The second drive outlet is preferably located on a raised portion/section 111 of the base unit 100 relative to the first drive outlet. Through the first and second drive outlets 102, 104, the base unit 100 provides power and/or drive to the bowl 200 and food processor 500 respectively, in particular for driving food processing tools. Thus, the first drive outlet 102 provides a bowl tool mount and the second drive outlet provides a processor tool mount.

The bowl 200 houses a rotatable drive shaft 202 (shown in FIGS. 4 and 5) which is typically provided in the base of the bowl 200, and powered by the first drive outlet 102 when the bowl 200 is fitted to the first drive outlet 102. The bowl 200 is also provided with a removable lid 210, which is provided with a preferably centrally positioned aperture 212. The lid 210 may optionally be made of a transparent material. The lid aperture 212 may be covered by a cap, for example, when not in use. Means for heating the contents of the bowl 200 may be provided in the base unit 100 or in the bowl 200, for cooking purposes. The bowl 200 preferably has a circular cross-section, in order to promote even processing of food.

The transmission assembly 300 may be coupled with the second drive outlet. The transmission assembly 300 is substantially cylindrical. A platform 310 is provided on the top section of the transmission assembly 300, on which the processor compartment 400 may be fitted. The platform 310 is arranged so as to hang over the bowl 200.

The processor attachment 400 comprises a body 402 having a dispensing chute 412, a lid 404, a feed chute 406, and a cutting disc 430 (shown in FIGS. 2 to 5) which is powered by the second drive outlet. The cutting disc 430 may be interchangeable with different cutting discs 430, each performing various processing functions (such as grating, shredding, and slicing). Torque is transmitted from the second drive outlet 104 to the cutting disc 430 via the transmission assembly 300. The lid 404 and the body 402 are capable of fitting together to form a processing chamber 410, for example by means of a bayonet fitting, snap fitting, screw fitting, or any other suitable fitting. The cutting disc 430 is held within the chamber 410. The feed chute 406 of the processor compartment 400 is provided in an off-centre position on the lid 404 such that food ingredients placed into the feed chute 404 may fall onto the cutting disc 430 to be processed. The feed chute 406 may be provided with a removable plunger 414 (shown inside the feed chute 406 in FIG. 1a).

The dispensing chute 412 extends away from a side wall of the body 402 on the opposite side of the processing compartment 400 to the feed chute 406. The dispensing chute 412 may be tapered and downwardly sloped, and at least one side wall of the dispensing chute 412 may extend substantially tangentially away from the side wall of the body 402. A distal end of the dispensing chute 412 relative to the chamber 410 may be angled downwardly so as to deflect food ingredients downwardly. The end of the dispensing chute 412 defines an outlet 416 (not visible in FIG. 1a) through which processed food ingredients may exit the processor compartment 400. The length of the dispensing chute 412 is configured so as to align the outlet 416 of the dispensing chute 412 with the aperture 212 provided in the lid 210 of the bowl 200 when the processor compartment 400 is correctly aligned, so as to allow food ingredients processed by the processor compartment 400 to be dispensed directly into the bowl 200. The dispensing chute 412 may comprise vents 413 arranged to permit steam rising from the bowl 200 to be vented from the dispensing chute 412 when the dispensing chute 412 is positioned over the aperture 212 during any cooking process.

Figure 1B:
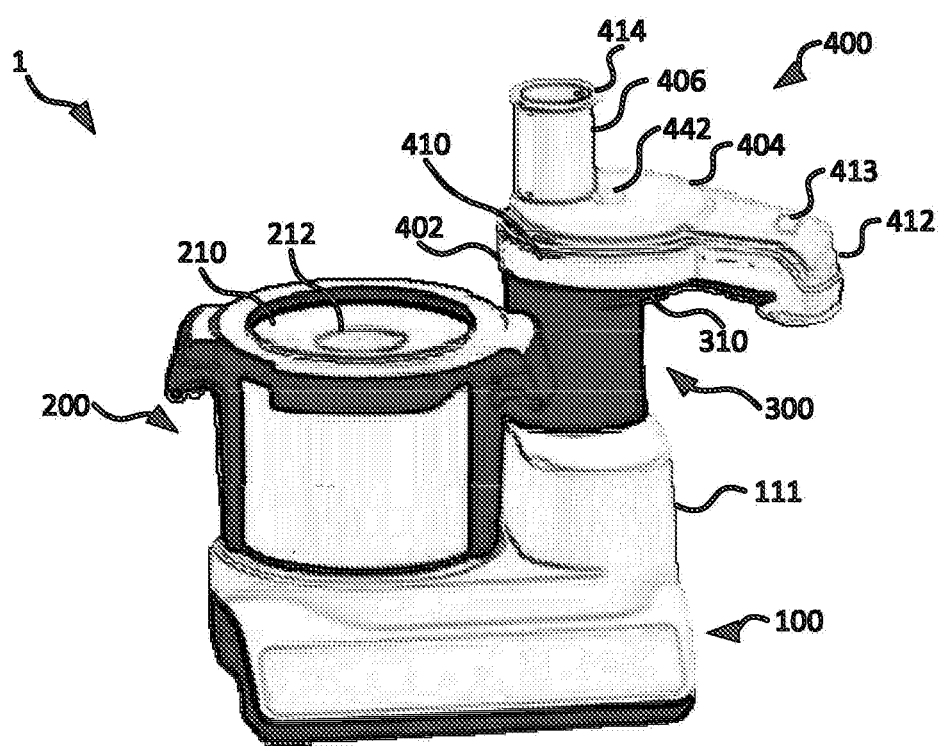
FIG. 1b shows the kitchen appliance with the food processor in a second position.

FIG. 1b shows the kitchen appliance of FIG. 1a in a different configuration, in which the food processor 500 is arranged to output food ingredients in a second position. The dispensing chute 412 of the food processor 500 is arranged to be moveable relative to the base unit 100. Preferably, the transmission assembly 300 is capable of being rotated about the second drive outlet 104 between a plurality of indexed positions, as will be described in detail later on. In a first position, the dispensing chute 412 is arranged to output processed food ingredients into the bowl 200, as described. In a second position, the dispensing chute 412 is positioned to output processed food ingredients away from the kitchen appliance 1. This allows food ingredients processed by the processor compartment 400 to be dispensed into a separate container, providing the kitchen appliance 1 with the functionality to perform a number of processing operations at the same time. This may be used, for example, to prepare two separate dishes. It will be appreciated that the transmission assembly 300 and the processor compartment 400 could be moved relative to the base unit 100 in a way other than (or in addition to) by rotation, for example, by sliding, pivoting bodily about a suitable axis (vertical, horizontal, or other), movement via an articulated arm, or another translational movement. The processor compartment 400 could alternatively be rotated relative to the transmission assembly 300 with the transmission assembly 300 being fixed, or in a further alternative only the dispensing chute 412 could be rotated relative to the body 402. The dispensing chute 412, or the processor compartment 400, may be arranged so that it can be raised and lowered so as to dispense at different heights, either by hinging of the dispensing chute 412, or by a telescoping arrangement, or by another suitable means.

Figure 2:
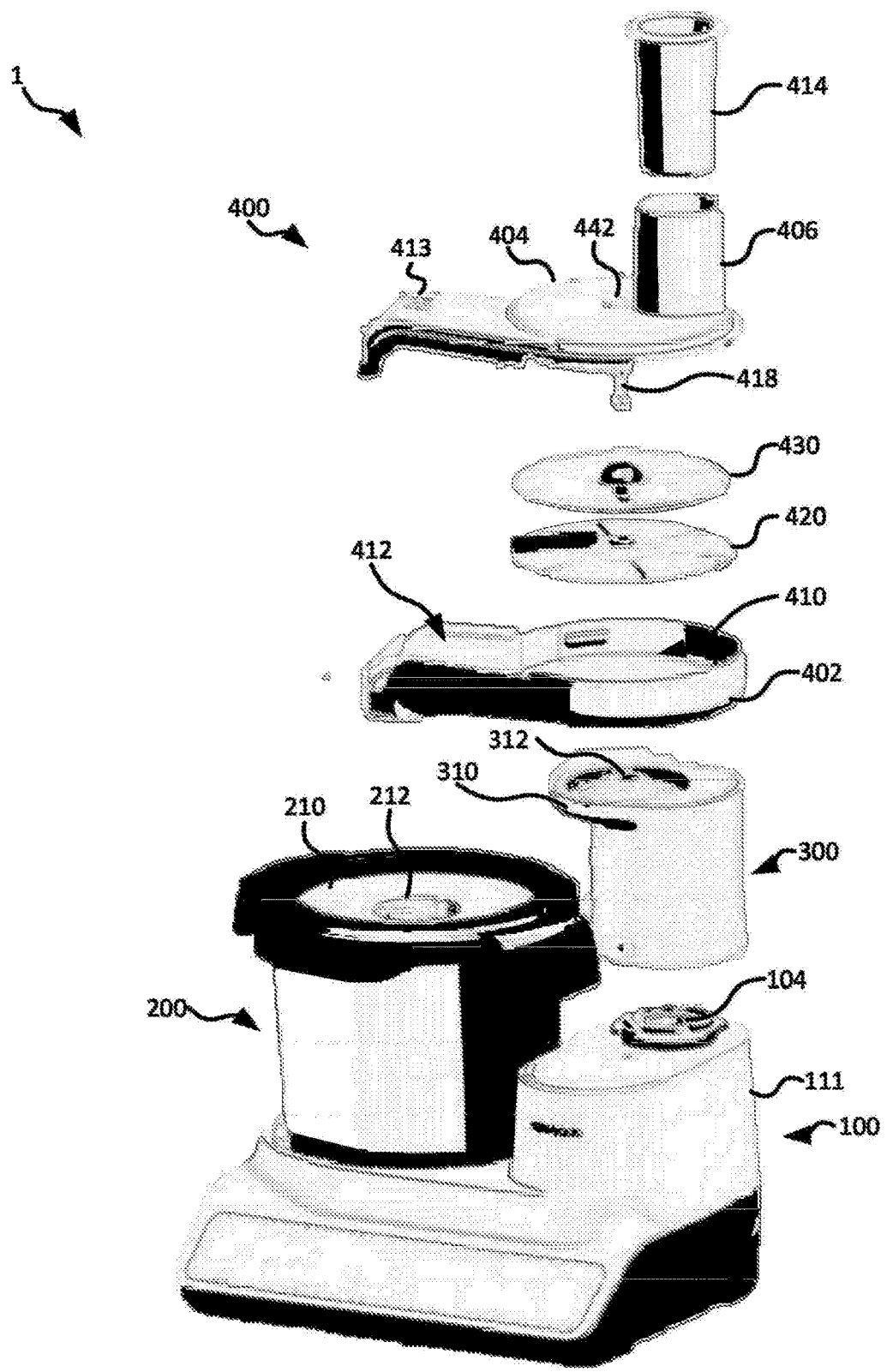
FIG. 2 shows an exploded view of the food processor.

FIG. 2 shows an exploded view of the food processor 500. The processor compartment 400 further comprises a rotatable drive shaft 418 and a pusher ("ejector") disc 420, which are both contained within the chamber 410 of the processor compartment 400. The drive shaft 418 is supported by a bearing 442 provided centrally on the lid 404. The free end of the drive shaft 418 is arranged to protrude out of an aperture 408 provided in the bottom of the body of the processor compartment and into an aperture 312 arranged on top of the transmission assembly 300 so as to engage with a coupling 320 (not visible in FIG. 2). The aperture 312 may be located off-centre with respect to the second drive outlet 104. The cutter disc 430 and the pusher disc 420 are fitted onto the drive shaft 418 with the cutter disc 430 located above the pusher disc 420 on the drive shaft 418. The drive shaft 418 may comprise a faceted profile near the first end of the drive shaft 418, so as to cooperate with corresponding faceted apertures provided at the centre of both the cutter disc 430 and the pusher disc 420.

Figure 3:
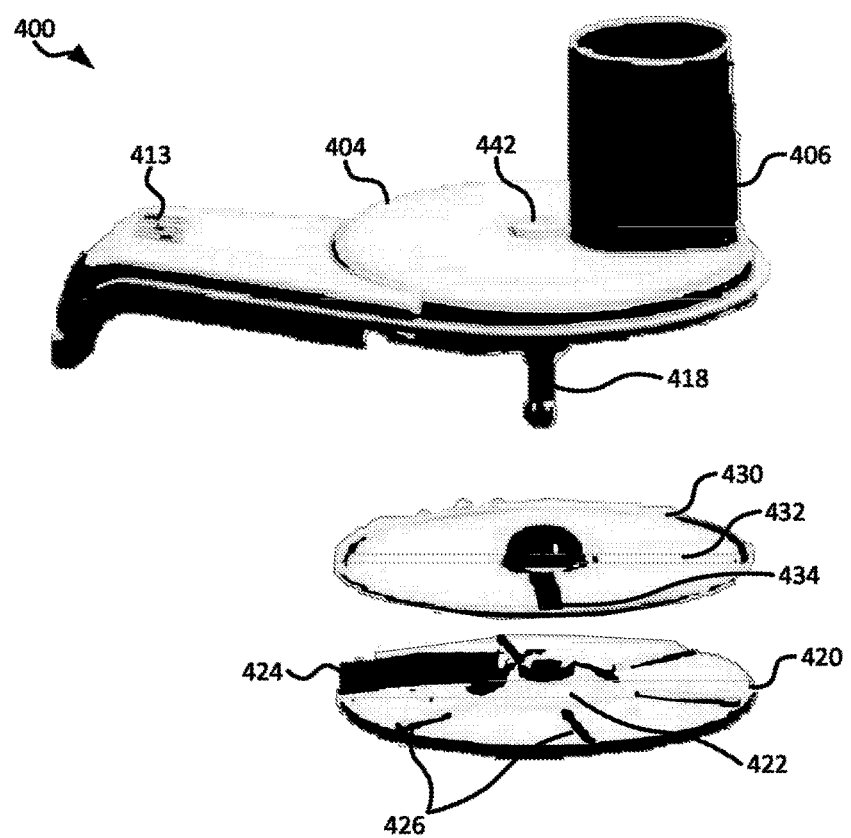
FIG. 3 shows an exploded view of the lid of the food processor.

FIG. 3 shows an exploded view of the lid 404 of the food processor 500. The cutter disc 430 comprises at least one blade 432 for processing food ingredients and at least one aperture 434 which processed food ingredients may pass through. The pusher disc 420 comprises a raised central section 422 arranged to conform to a corresponding shaped surface provided on the body 402, at least one wall 424, and a plurality of ridges 426. The pusher disc 420 is preferably arranged so extend across the body of the processor compartment 400, in order to prevent any food ingredients falling underneath it. The wall or walls 424 and the plurality of ridges 426 are provided on the top surface of the pusher disc 420, and are preferably arranged to extend substantially radially along the pusher disc 420. Optionally, the wall or walls 424 may define a curved shape with respect to the radius of the pusher disc 420.

Figure 4:
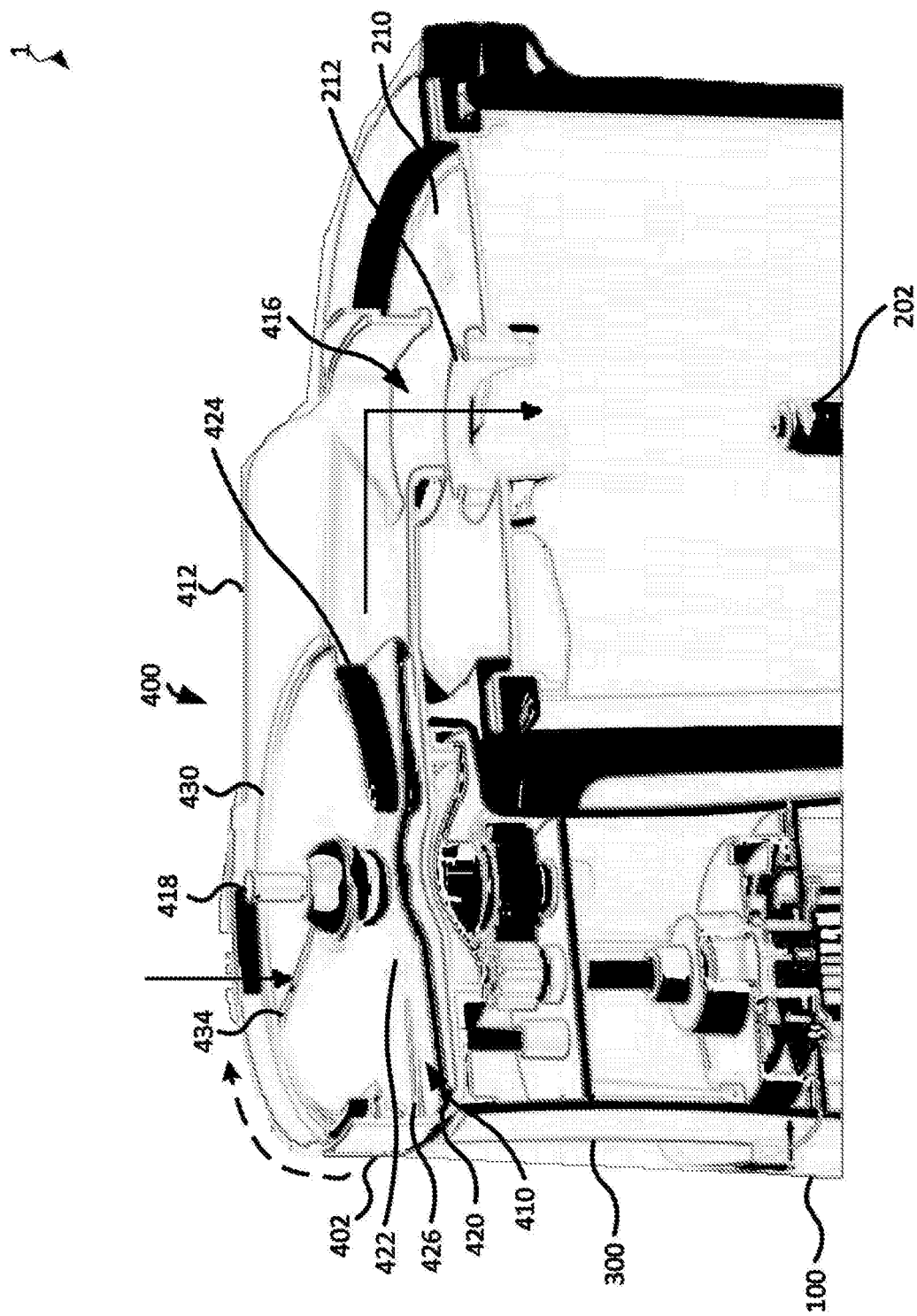
FIG. 4 shows a partial cutaway view of the kitchen appliance.

FIG. 4 shows a partial cutaway view of the kitchen appliance 1, with the outlet 416 of the food processor 500 positioned over the bowl 200. The lid 404 is not shown for reasons of clarity. The solid arrows are shown to indicate the direction of travel of processed food ingredients through the processor compartment 400. The dotted arrows shown indicate the direction of rotation of the drive shaft 418. When the processor compartment 400 is in operation, food ingredients fed into the feed chute 414 fall onto the rotating cutting disc 430 and are sliced, shredded, grated, or otherwise processed by the blade 432. Processed food ingredients fall through the aperture 434 onto the rotating pusher disc 420. The processed food ingredients are then urged towards the edge of the pusher disc 420 due to the forces created in the rotating system, and then enter the dispensing chute 412. This process is assisted by the wall or walls 424 and the plurality of ridges 426 provided on the pusher disc 420 collecting the processed food ingredients.

In rotation, the wall or walls 424 and the ridges 426 meets the processed food ingredients and sweeps the food ingredients into the dispensing chute 412 and out of the processor compartment 400 via the outlet 416, as shown by the arrow.

The wall or walls 424 and the ridges 426 may also act to collect food ingredients adhering to the interior side walls of the chamber 410 and prevent food ingredients from lying flat on the pusher disc 420. In use, the speed at which the drive shaft 418 is driven is preferably controlled to be sufficient such that food ingredients entering the dispensing chute 412 proceed to the outlet 416 rather than stopping in the dispensing chute 412 due to friction. Food ingredients which overshoot the outlet 416 impact the curved wall of the dispensing chute 412, causing them to be deflected downwards out of the outlet 416.

Figure 5:
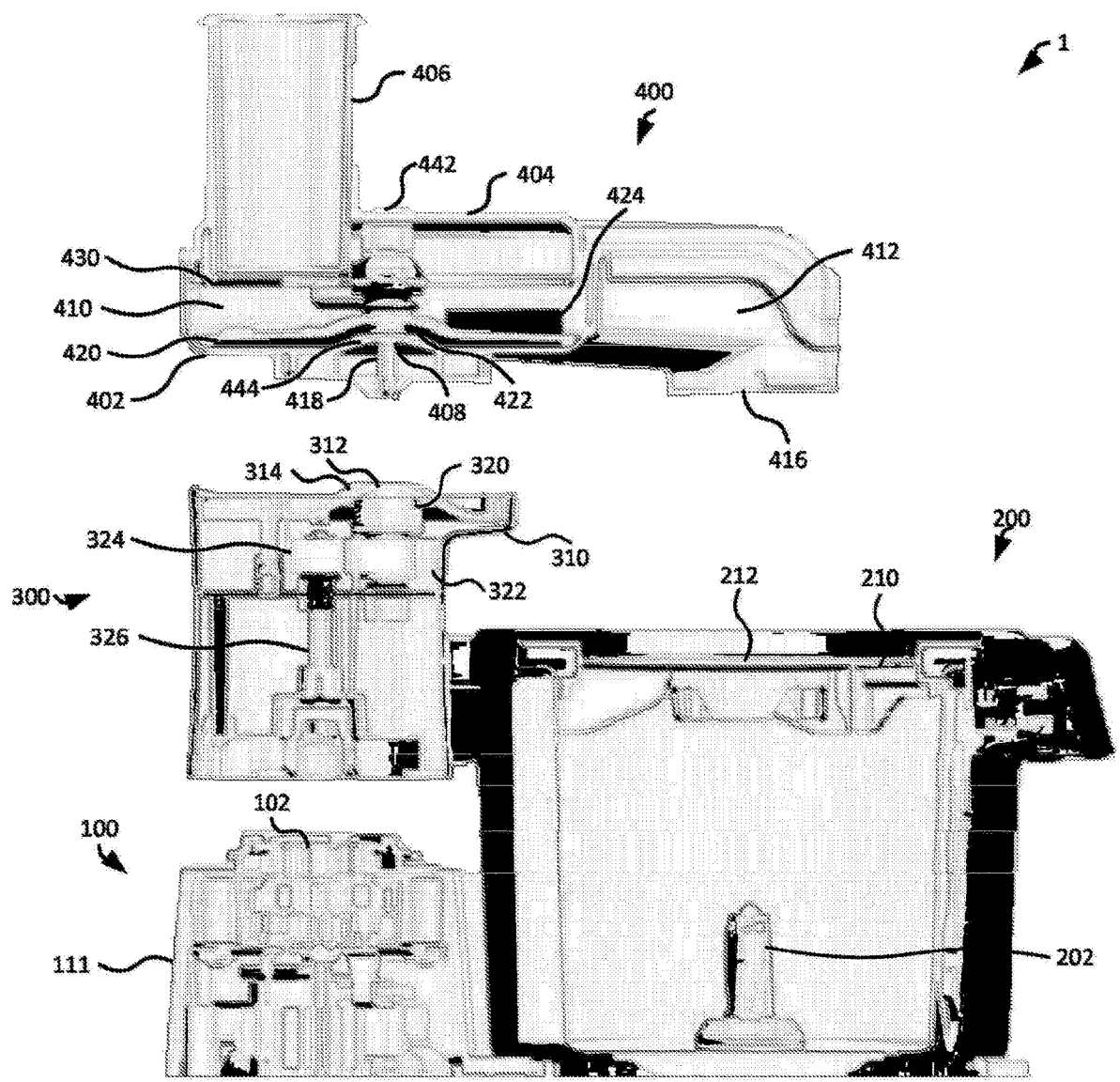
FIG. 5 shows a partial exploded cutaway view of the kitchen appliance.

FIG. 5 shows a partial exploded cutaway view of the kitchen appliance 1. The raised section 444 on the bottom of the body 402 of the processor compartment 400 may be arranged to cooperate with a raised section 314 on the top of the transmission assembly 300 on which the aperture 312 is located, so as to assist in locating the drive shaft 418 into the aperture 312. The coupling 320 may be driven by a first gear 322 interfacing with a second gear 324 provided on a first end of a transmission drive shaft 326, which is in turn driven by the second drive outlet provided in the base unit 100, as described above.

Figure 6A:
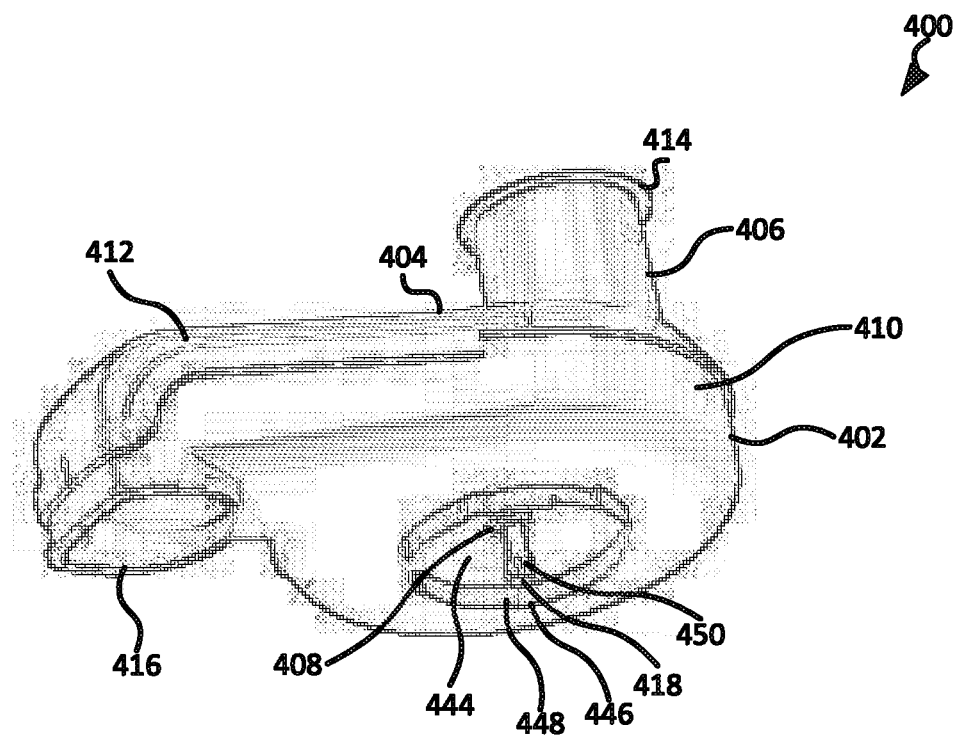
FIG. 6a shows a perspective view from underneath of the food processor.
Figure 6B:
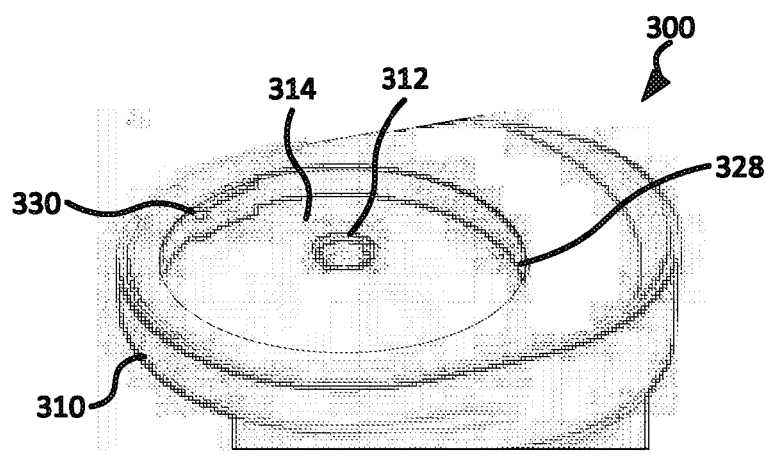
FIG. 6b shows a perspective transmission assembly of the food processor.

FIG. 6a shows a perspective view from underneath of the processor compartment 400. FIG. 6b shows a perspective transmission assembly 300 of the food processor 500. The processor compartment 400 is arranged to attach to the transmission assembly 300 via a bayonet fit, provided by a plurality of tabs 448 extending outwardly from a ring-shaped wall 446 provided on the bottom of the body 402, where the tabs 448 are arranged to cooperate with a plurality of tabs 330 provided in a circular recess 328 located on the top of the transmission assembly 300. The drive shaft 418 and the aperture 312 arranged to receive the drive shaft 418 may be provided centrally within the ring-shaped wall 446 and the recess 328 respectively. It will be appreciated that other fits between the processor compartment 400 and the transmission assembly 300 could also be used, such as a screw fit.

At least one ridge 450 is provided on the side on the free end of the drive shaft 418, extending longitudinally along the drive shaft 418. Preferably, a plurality of ridges 450 are provided. Apart from the ridges 450, most of the part of the drive shaft 418 that extends out of the processor compartment 400 has a plain diameter.

Figure 7:
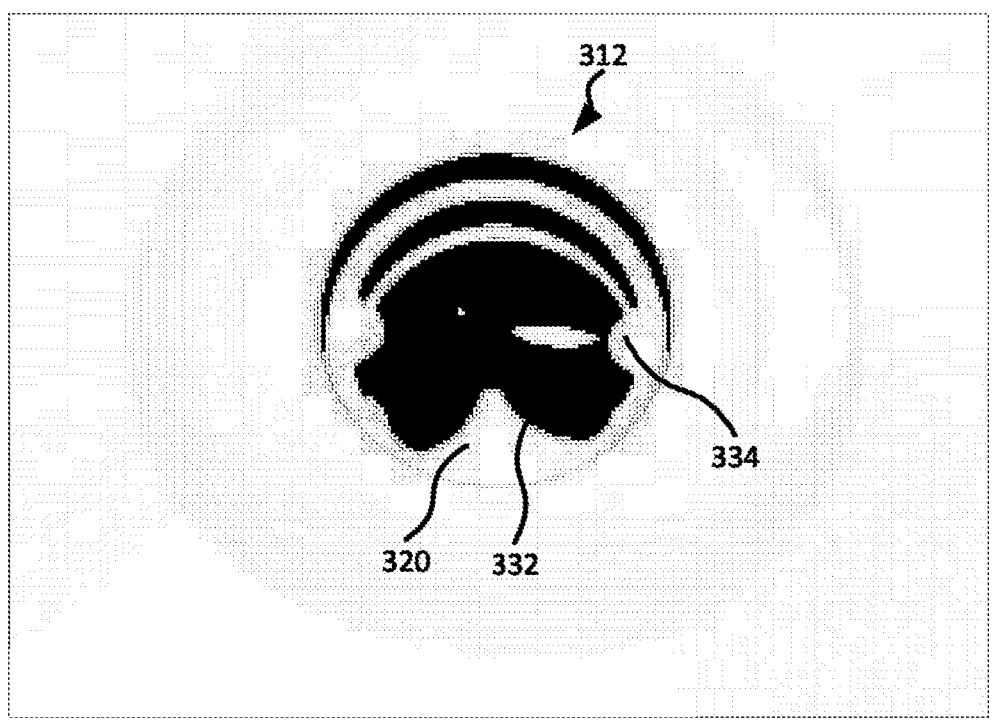
FIG. 7 shows a top view of the transmission assembly.

FIG. 7 shows a top view of the transmission assembly 300. The aperture 312 holds the coupling 320 which is provided with teeth 332 arranged to be engaged with the ridges 450 provided on the drive shaft 418, providing a means for torque transmission to the drive shaft 418. The teeth 332 preferably have sloped tops in order to assist with the engagement of the drive shaft 418. The aperture 312 is also provided with one or more protruding features 334, which extend inwardly towards the centre of the aperture 312. Preferably, the protruding features 334 are provided within the aperture 312 but at a different position to the teeth 332 of the coupling 320. Preferably, the protruding features 334 are provided at or proximate the top of the aperture 312. Using a plurality of protruding features 334, which are preferably symmetrically-arranged, may be advantageous in that the impact can be evenly-spread over multiple protruding features 334. The protruding features 334 and the ring that bears it may be either integrally formed with the machine or a separate, replaceable component fixed so as not to rotate.

Optionally, the protruding features 334 may be provided on a replaceable annulus-shaped plate located within the aperture 312 and fixed so as to resist rotation, so as to allow the protruding features 334 to be replaced in case of excessive wear. A top panel of the transmission assembly may be arranged to be removable to allow the plate bearing the protruding features 334 to be removed (and, if necessary, replaced). Alternatively, the protruding features 334 may be integrally formed within the aperture 312. The aperture 312 is arranged so as to be wider than the drive shaft 418, such that the protruding ridges 450 provided on the drive shaft 418 fit into the aperture 312. The length of the protruding features 334 is arranged such that the part of the drive shaft 418 with a plain diameter fits between the protruding features 334, but the ridges 450 provided on the drive shaft 418 may contact the protruding features 334 if one or more of the protruding features 334 is aligned with one or more of the ridges 450. The ridges 450 may be provided with sloped top and bottom sections to assist in guiding them past the protruding features during fit or removal of the drive shaft 418.

In use, it may be necessary for the user to remove the lid 404 to inspect the interior of the chamber 410, or to perform maintenance and/or cleaning. For safety reasons, it should not be possible for the user to access the cutting disc 430 while it is rotating. The described arrangement of the draft shaft 418 and the aperture 312 is configured to provide a safety interlock assembly for inhibiting the rotation of the dive shaft 418 when the lid 404 is removed.

Figure 8A:
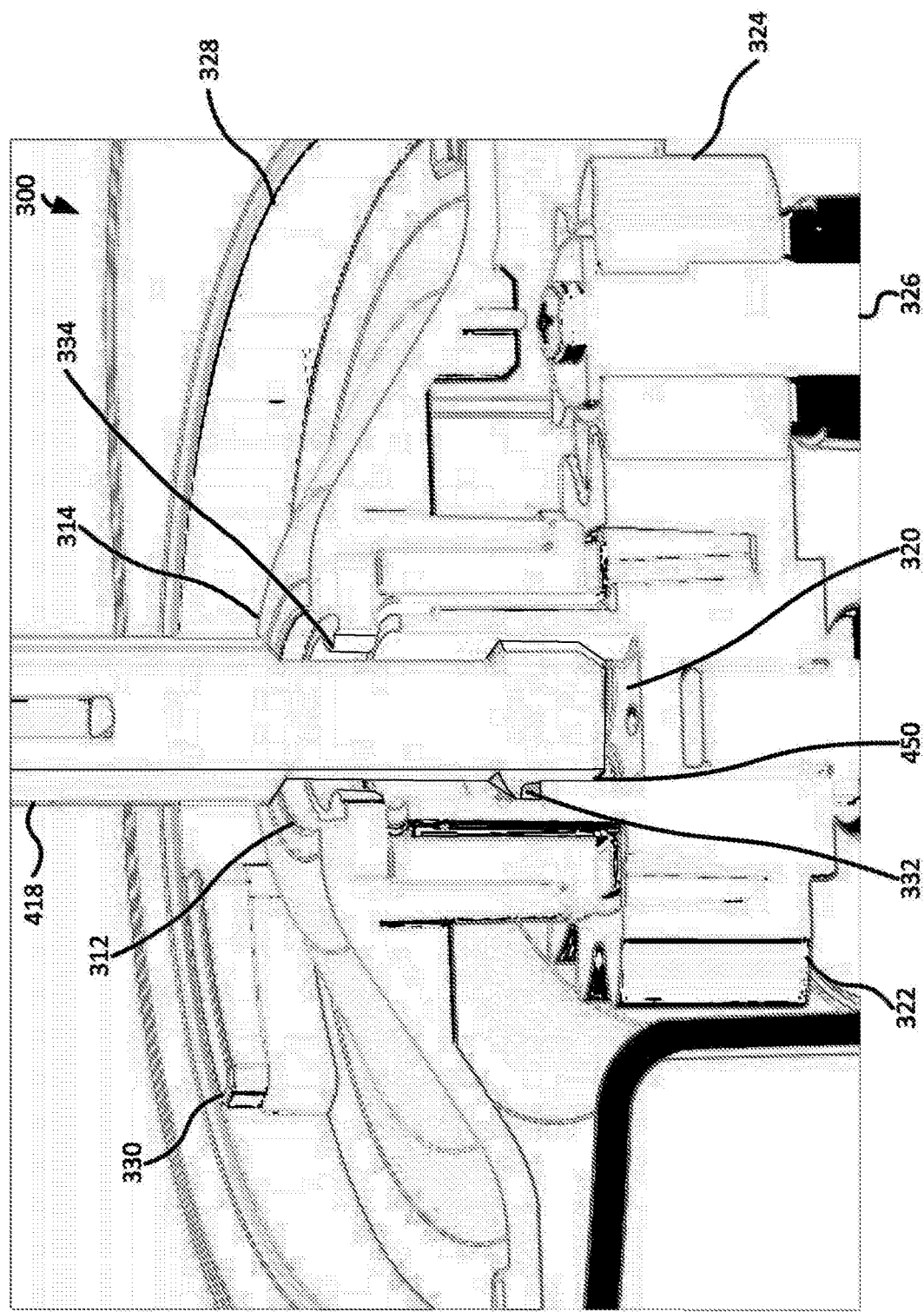
FIG. 8a shows a safety interlock assembly with a drive shaft in a first position.

FIG. 8a shows a safety interlock assembly with a drive shaft 418 in a first position. This may also be referred to as a "coupled" position, for example by way of two complementary components being coupled. The other components of the processor compartment 400 are not shown. In the first position, the drive shaft 418 is inserted through the aperture 312 and the ridges 450 arranged on the drive shaft 418 are in engagement with teeth 332 of the coupling 320, allowing the drive shaft 418 to be driven by the transmission assembly 300.

Figure 8B:
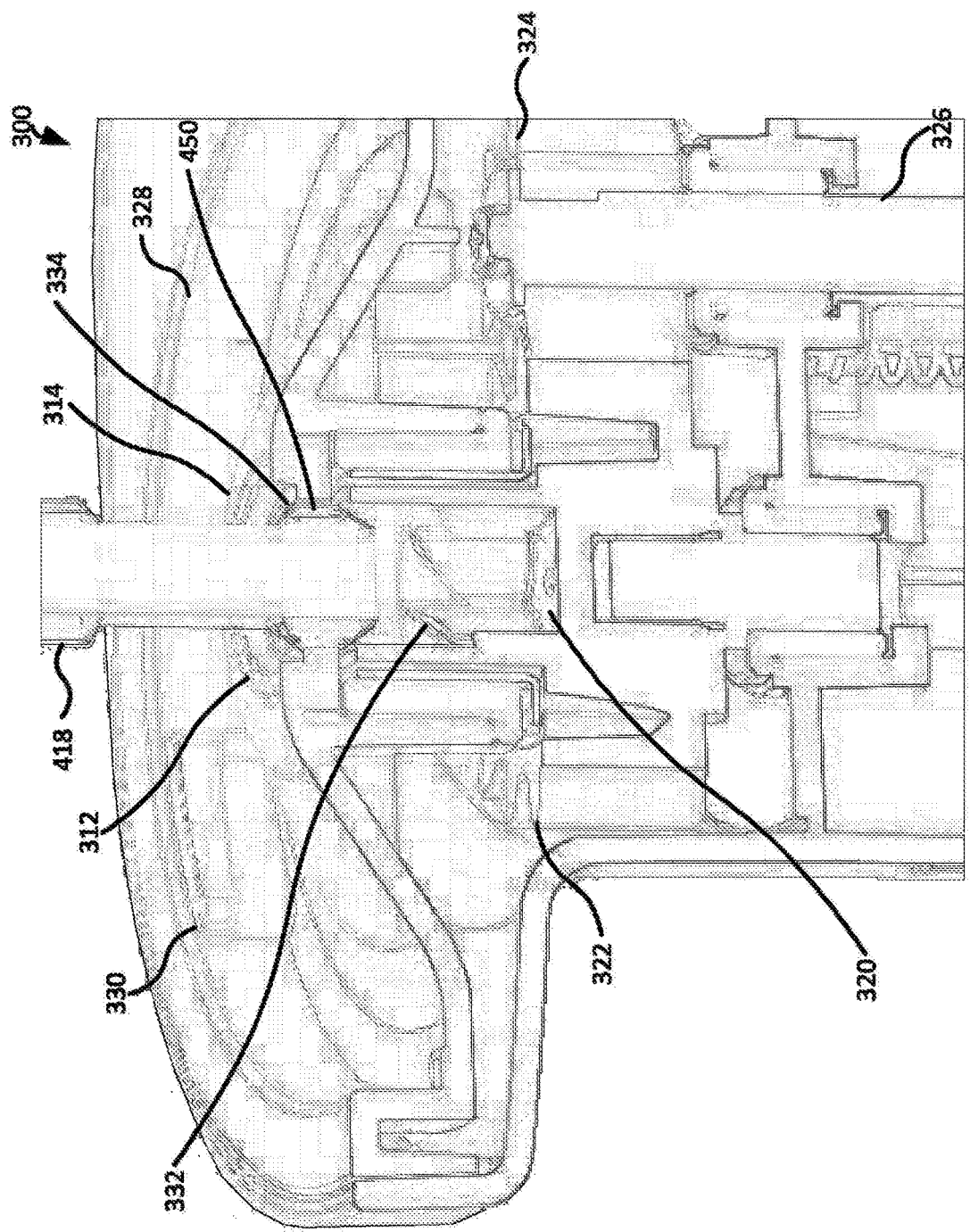
FIG. 8b shows the safety interlock assembly with the drive shaft in a second position.

FIG. 8b shows the safety interlock assembly with the drive shaft 418 in a second position. This may be referred to as an "uncoupled" position, for example resulting from two coupled components being uncoupled. Where the lid 404 is lifted from the body 402 of the processor compartment 400 by a user, the drive shaft 418 disengages with the coupling 320. Where this occurs when the drive shaft 418 is rotating, the protruding features 334 interfere with the ridges 450 provided on the end of the drive shaft 418 as the second end of the drive shaft 418 is lifted past the protruding features 334, as shown in FIG. 8. This interference inhibits the rotation of the drive shaft 418 so as to cause it to stop, providing a simple safety interlock preventing user access to the rotating cutting disc 430. The safety interlock will also operate where the whole processor compartment 400 is lifted from the transmission assembly 300 (following the disengagement of the bayonet fit between the components). The speed at which the drive shaft 418 is driven in continuous operation is sufficient such that the protruding features 334 will interfere with the rotating ridges 450 on the drive shaft 418 before the entire drive shaft 418 passes the protruding features 334, where the lid 404 or processor compartment 400 is removed at a reasonable speed. The protruding features 334 may also assist in locating the drive shaft 418 centrally as the drive shaft 418 is inserted into the aperture 312. The ridges 450 and/or the protruding features 334 preferably comprise a tough and durable material, such as stainless steel, so as to withstand repeated clashes. The same material may be used for the teeth 332.

Figure 9:
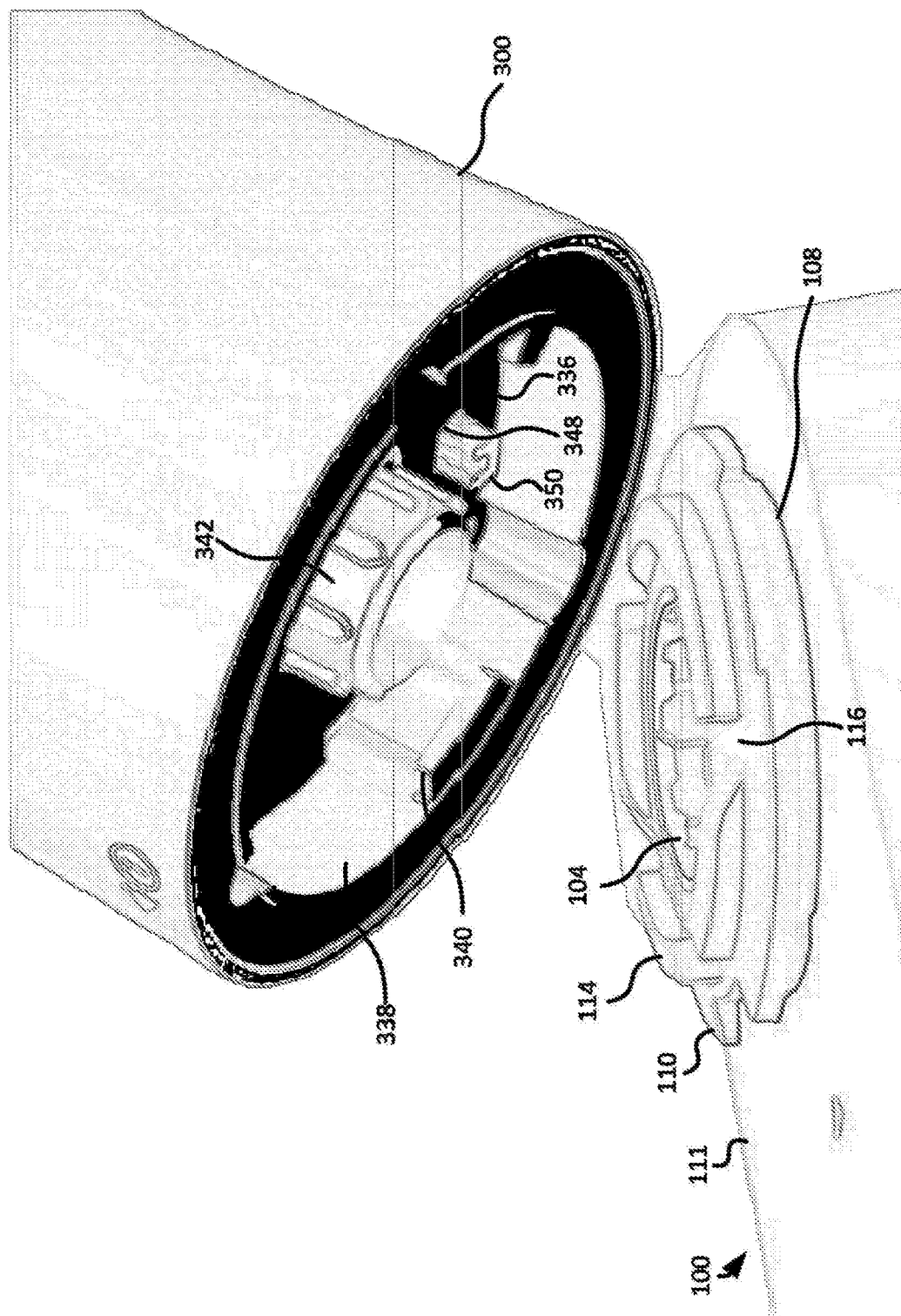
FIG. 9 shows an arrangement for attaching the transmission assembly to a base unit of the kitchen appliance.

FIG. 9 shows an arrangement for attaching the transmission assembly 300 to a base unit 100 of the kitchen appliance 1. The transmission assembly 300 is arranged to attach to the base unit 100 via a bayonet fitting between a plurality of tabs 340 provided on an interior side wall 338 of the transmission assembly 300 and a recessed wall 110 provided on an annular housing 108 for the second drive outlet 104. The transmission shaft 326 may be arranged to protrude through an aperture provided in a bottom plate 336 of the transmission assembly 300 so as to removably couple with the second drive outlet 104 via a gear coupling 342 provided on a free end of the transmission shaft 326. The housing 108 for the second drive outlet 104 preferably a wall 114 having recesses 116, where the wall extends upwardly from the top surface of the housing. The wall 114 is arranged to act as an annular cam, with the recesses 116 acting as detents, in a ratchet mechanism with a projection (such as a "peg") 350 is provided in the transmission assembly 300 and protruding through an aperture provided in the plate 336. The peg 350 is urged downwardly by a spring provided internally to the transmission assembly 300. The recesses 166 are sloped on one side so as to allow the transmission assembly 300 to be rotated in one direction, but to be stopped from rotating in the other direction by the abutment of the peg 350 and the wall 114.

The described ratchet mechanism allows the transmission assembly 300 to be rotated between a plurality of fixed positions when the transmission assembly 300 is attached to the second drive outlet 104. The plurality of fixed positions include the previously described first and second position, and preferably also include a position in which the bayonet tabs 340 are aligned so as to allow the transmission assembly 300 to be fitted or removed from the base unit 100. Preferably, the ratchet mechanism is arranged such that the transmission assembly 300 cannot be removed from the bayonet fit where the ratcheting mechanism is not in this position.

It will be appreciated that an alternative mechanism could be used to fix the position of the transmission assembly 300 with respect to the base unit 100, such as the use of a sprung peg 350 that is depressible by the user. The sprung peg 350 could alternatively be located in the base unit 100 with the recessed walls 114 being located on the underside of the transmission assembly 300.

The components of the processing attachment are preferably suitable to be cleaned in a dishwasher, and should be made out of food-safe materials. The cutting disc 430 is preferably made out of a metal, such as stainless steel. The pusher disc 420 is preferably made out of a flexible material such as rubber or silicone, although it must be sufficiently rigid so as withstand the stresses of operation. The use of such a material allows for the pusher disc 420 to vibrate and/or deflect in use, which assists in preventing the adherence of materials to the disk. The wall or walls 424 may optionally be made out of a different, less rigid material. The use of a flexible material for the wall or walls 424 mitigates any damage caused to soft food ingredients by the wall of the chamber 410, which is a particular problem at the corner between the second side wall of the dispensing chute 412 and the side wall of the chamber.

The dispensing chute 412 and/or the lid 210 may be provided with an attachment (not shown) arranged to be capable of connecting the outlet 416 with the aperture 212 by locking with corresponding elements provided on the dispensing chute 412 and/or the lid 210, so as to prevent the egress of food ingredients. Alternatively, the extension for linking the dispensing chute 412 and the lid 210 may be integrally formed with the chute 412 and/or the lid 210. The aperture 212 provided in the lid 210 may alternatively be located in a non-central position on the lid 210.

Figure 10:
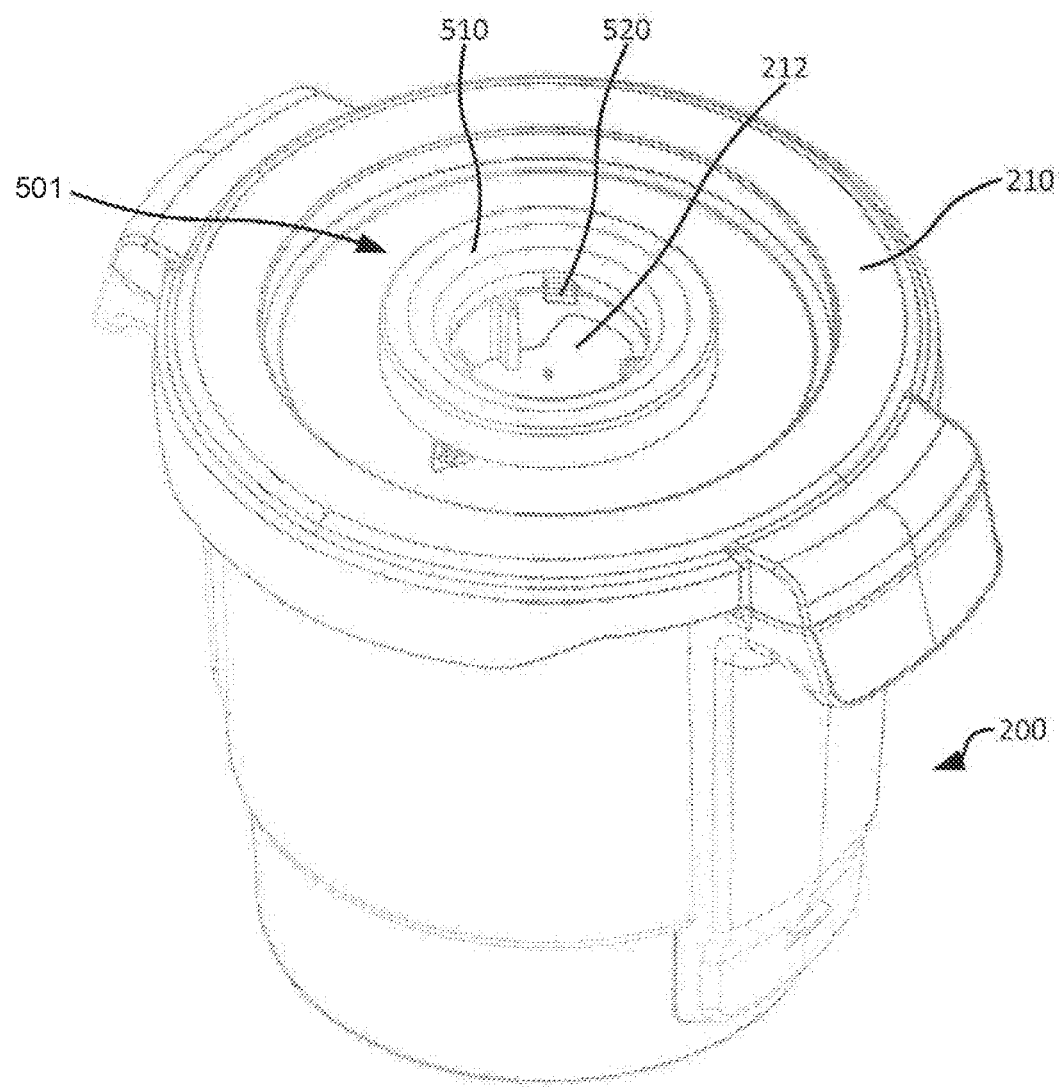
FIG. 10 shows an attachment with a funnel for a bowl of a kitchen appliance.

As illustrated in FIG. 10, an attachment in the form of a funnel 501 with an internal sloping surface 510 may be attached to the rim of the aperture 212 of the lid 210 of the bowl 200 using tabs 520. The internal sloping surface 510 of the funnel 501 helps guide material being dispensed from the outlet 416 of the dispensing chute 412 of the processor attachment 400 through the aperture 212 and prevents it collecting around the rim of the aperture 212. Whilst tabs 520 are shown here as the attachment means, other releasable attachment means may be used, including clips, ties, snap-fittings, screws, bolts and similar attachment means. Alternatively, the funnel 501 may be integrally formed with the lid 210. The funnel 501 should preferably be dimensioned so as not to extend above the bottom of the dispensing chute 412 so as not to obstruct its movement, alternatively it may partially surround the outlet 416 so as to further prevent egress of material being dispensed from the outlet 416 onto the top of the lid 210 whilst still allowing the dispensing chute to be rotated away from the aperture 212 in at least one direction. Optionally the funnel 501 may form a seal (e.g., a rubber seal) with the lid 210 and/or may extend into the aperture 212 to prevent leakage of material between the lid 210 and the funnel 501.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A kitchen appliance, comprising:
   a base unit having a drive with a rotational axis; and
   a food processor having an outlet for outputting processed food;
   wherein the food processor is arranged to be mounted on the base unit for operation such that the food processor is configured to rotate about an axis parallel to the drive rotational axis between two different operating positions relative to the base unit, whereby the outlet is positional at two different places relative to the base unit; and
   wherein at least part of the base unit is arranged to provide a platform for supporting a bowl, wherein the food processor is arranged to be mounted to the base unit at a position that is adjacent the platform for supporting the bowl, wherein the food processor outlet is arranged to output processed food ingredients over the platform when moved to a first position, and wherein the food processor is arranged to output processed food ingredients at a place removed from the platform for supporting the bowl when moved to a second position.

2. The kitchen appliance of claim 1, wherein the movement of the food processor is rotation about a fixed axis, and wherein the food processor comprises a rotatable processor tool mount for a processing tool.

3. The kitchen appliance of claim 1, wherein the two positions between which the food processor may rotate are indexed operating positions.

4. The kitchen appliance of claim 1, wherein the food processor is arranged to be detachably mounted to the base unit, wherein the food processor is arranged to receive the drive from the base unit.

5. The kitchen appliance of claim 1, further comprising a bowl arranged to be removably mounted on the base unit, wherein the bowl is provided with a rotatable bowl tool mount for a food processing tool arranged to be driven by the base unit.

6. The kitchen appliance according to claim 5, wherein the food processor comprises a processing compartment for food being processed and is arranged to output processed food ingredients from the outlet into the bowl during operation of the kitchen appliance without interruption of drive to the bowl tool mount, wherein the food processor is arranged to be driven independently of the bowl tool mount provided within the bowl.

7. A kitchen appliance, comprising:
a base unit;
a bowl arranged to be mounted to the base unit;
a rotatable bowl tool mount provided within the bowl for a food processing tool, the bowl tool mount arranged to be driven by the base unit;
a food processor having an outlet for outputting processed foods, the food processor being arranged to be mounted to the base unit and the food processor being arranged to receive drive from the base unit;
wherein the food processor is arranged to process food ingredients in a processing compartment and to output processed food ingredients from the outlet into the bowl during operation of the kitchen appliance without interruption of drive to the bowl tool mount; and
wherein the food processor is arranged to be driven independently of the bowl tool mount provided within bowl, wherein the food processor and bowl tool mount are driven separately wherein the food processor is arranged to receive drive from the base unit, and wherein the rotatable processor tool mount has an axis of rotation that is non-coaxial with an axis of rotation of the rotatable bowl tool mount.

8. The kitchen appliance of claim 7, wherein the food processor is mounted to the base unit via a housing containing a transmission assembly arranged to transmit drive from the base unit to the food processor, wherein the food processor comprises a compartment for processing food, and wherein the compartment is detachably mountable to the housing.

9. The kitchen appliance of claim 7, further comprising a lid arranged to seal with a rim of the bowl, the lid having an aperture aligned to receive processed food ingredients output directly from the food processor from a position spaced above the bowl.

10. The kitchen appliance of claim 7, wherein the base unit is arranged to provide a raised portion for mounting the food processor, wherein a power source for the food processor is arranged in the base unit beneath the raised portion.

11. A food processor for a kitchen appliance, comprising:
a compartment for processing food ingredients, the compartment having an outlet for outputting processed foods;
a lid for closing the compartment; and
a drive shaft provided within the compartment for driving a tool, the drive shaft rotatably bearing on the lid;
wherein the lid is removable from a body for allowing inspection, maintenance and cleaning of the compartment; and a food processing tool arranged to be mounted to the drive shaft, wherein the food processing tool is arranged to slice or grate food ingredients, and further comprising an ejection device that is mountable to the drive shaft, wherein the ejection device is arranged to be rotated by the drive shaft within the compartment such that it will collect food processed by a rotating tool mounted above it, whereby processed food collected on the ejection device ejected from the food processor via centrifugal force.

12. The food processor of claim 11, wherein the drive shaft comprises one or more engagement elements arranged to be engaged so as to transmit drive to the drive shaft, wherein the engagement elements are provided at an end of the drive shaft remote from the lid.

13. The food processor of claim 11, further comprising a housing containing a transmission assembly, the housing being arranged to be mounted to the kitchen appliance, whereby to transmit rotatable drive to the driveshaft therefrom.

14. The food processor of claim 11, wherein the drive shaft is engaged by a coupling provided in a transmission assembly when the compartment is sealed by the lid when the compartment is mounted to the housing, wherein removal of the lid from the compartment while it is mounted to the transmission assembly causes the drive shaft to disengage from the coupling, and causes the drive shaft to move from a first position wherein it is engaged by the coupling to a second position in which the transmission assembly is arranged to inhibit rotation of the drive shaft.

15. The food processor of claim 11, further comprising the outlet for outputting processed foods, wherein the outlet is a chute through which processed food ingredients are output, and wherein the outlet is arranged such that it can pivot between a first position and a second position wherein the outlet is arranged to deflect outputted processed foods downwards.

16. The food processor of claim 11, comprising a safety interlock arrangement, wherein the lid and the housing are arranged to be coupled and uncoupled such that when coupled the drive shaft can receive drive, and when uncoupled drive of the drive shaft is inhibited; and wherein one or more interference elements are arranged to interfere with rotation of the drive shaft when the lid and the housing are uncoupled.

17. The food processor of claim 16, wherein the drive shaft is provided on the lid, and is arranged to receive drive from the housing when the lid and the body are coupled and wherein the drive shaft is moved from a first position, within the housing, when the lid and the housing are coupled to a second position, within the housing, when the lid and the housing are uncoupled wherein drive to the drive shaft is inhibited in the second position.

18. The food processor of claim 16, wherein the lid is arranged to seal the compartment, and wherein the drive shaft is rotatably mounted to the lid such that it driven via a rotatable bearing arrangement provided in the lid, and wherein the housing comprises a drive arranged to transmit drive to the drive shaft.

19. The kitchen appliance according to claim 1 that includes the food processor according to claim 11.

* * * * *